United States Patent [19]

Krzycki et al.

[11] Patent Number: 5,317,690
[45] Date of Patent: May 31, 1994

[54] SPECIAL SENSOR APPLIED METEOROLOGICAL IMAGE PROCESS

[75] Inventors: Edwin A. Krzycki, Omaha; Troy R. Luster, Bellevue; David L. Stone, Omaha, all of Nebr.

[73] Assignee: Harris Corporation

[21] Appl. No.: 820,490

[22] Filed: Jan. 14, 1992

[51] Int. Cl.$^5$ .............................................. G06F 13/00
[52] U.S. Cl. ..................................... 395/200; 364/420
[58] Field of Search .................. 395/200, 275, 550; 375/110, 22, 114; 364/420

[56] References Cited

U.S. PATENT DOCUMENTS

| H241 | 3/1987 | Duffy . | |
|---|---|---|---|
| 3,575,557 | 4/1971 | McCowen | 370/102 |
| 3,742,461 | 6/1973 | Forbes | 375/114 |
| 3,781,818 | 12/1973 | Pardoe et al. | 395/550 |
| 3,806,656 | 4/1974 | Tarel | 370/105.3 |
| 3,939,304 | 2/1976 | Ribes | 375/22 |
| 4,435,781 | 3/1984 | Stattel et al. | 395/275 |

Primary Examiner—Robert L. Richardson
Attorney, Agent, or Firm—Evenson, McKeown, Edwards & Lenahan

[57] ABSTRACT

A data decommutator architecture for decommutating an input data stream has a sync correlator section for synchronizing the input data stream including a sync code correlator formed of a first field programmable gate array allowing the sync code correlator to be programmed for synchronizing different data formats. A data storage buffer, having two storage banks is coupled to the sync code correlator for receiving sync data, correlator address and correlator write signals. A data decommutator section is provided for decommutating the data received from the data storage buffer. The data decommutator section includes a serial to parallel conversion circuit formed of a second field programmable gate array and a primary decommutating transputer. The second field programmable gate array is programmable to allow decommutation of different data formats. A post processing section receives decommutated data from the primary decommutating transputer via transputer links and provides a post processed decommutated data output. The post processing section includes at least one post processing transputer for processing the decommutated data into post processed decommutated data. The post processing section provides a secondary data output for cascading the data decommutator architecture with another data decommutator architecture to provide further levels of decommutation.

18 Claims, 16 Drawing Sheets

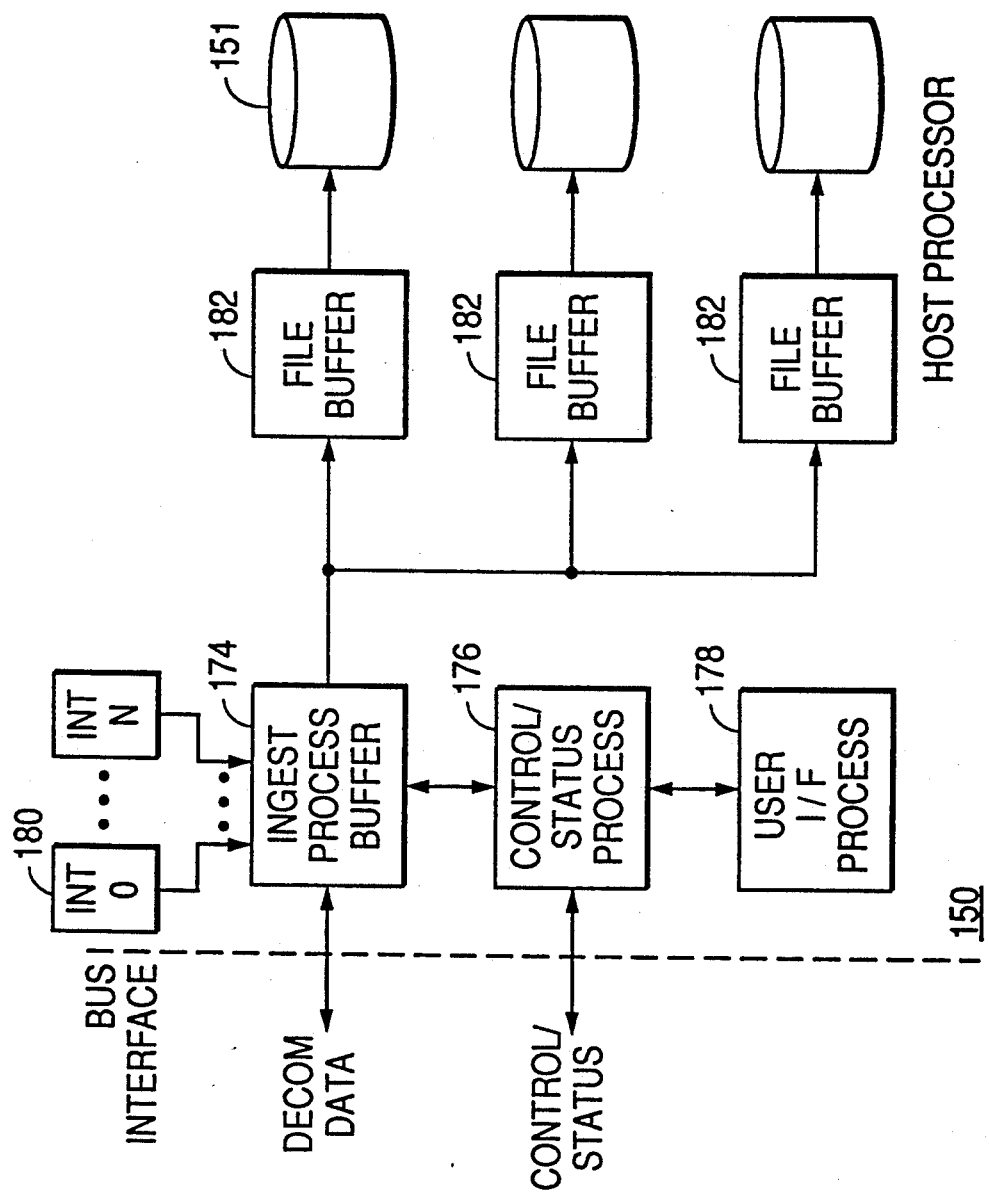

SPECIAL SENSOR APPLIED METEOROLOGICAL IMAGE PROCESS

This invention was made with government support under a proprietary government contract (Contract No. F04701-86-C-0155). The government has certain rights in this invention.

This application is related to application Ser. No. 07/820,501, entitled "Modular Distortion Correcting Real Time SSM/I Imagery Decommutator and Process for Producing Special Sensor Applied Meteorological Images", filed on an even date herewith and assigned to the Assignee of the present invention, the specification of which is herein expressly incorporated by reference.

FIELD OF THE INVENTION

This invention relates to decommutators for processing data streams and, more particularly, to a universal downloadable decommutator architecture used to process weather satellite data streams.

BACKGROUND OF THE INVENTION

Data decommutators are known for processing data streams such as from satellite downlinks, e.g. weather or telemetry data, tape units, avionic devices, etc. Generally, the known data decommutation equipment is large and inflexible. The functions performed by the data decommutation equipment are typically hardwired into the circuitry such that any modifications require redesign and replacement of the hardware. Any additional functionality in these devices requires further additional circuitry. Therefore, the number of functions which can be performed by a known data decommutator are greatly limited and the maintenance and updating of the equipment is difficult and cost-intensive.

Other known data decommutators allow the downloading of software applications to allow greater functionality. However, these downloadable decommutators provide little post processing capability and do not have the cascadability necessary to perform several levels of data decommutation.

There is therefore needed a decommutator which is both downloadable and cascadable. Such a downloadable decommutator should also provide substantial post processing capabilities.

SUMMARY OF THE INVENTION

The present invention meets these needs by providing a universal downloadable decommutator architecture which consists of circuit card assemblies that plug into a backplane of a microcomputer. The universal downloadable decommutator includes a sync correlator section for synchronizing the input data stream including a sync code correlator formed of a first field programmable gate array allowing the sync code correlator to be programmed for synchronizing different data formats. A data storage buffer, having two storage banks, is coupled to the sync code correlator for receiving sync data, correlator address and correlator write signals. A data decommutator section is provided for decommutating the sync data received from the data storage buffer. The data decommutator section includes a serial to parallel conversion circuit formed of a second field programmable gate array and a primary decommutating transputer. The second field programmable gate array is programmable to allow decommutation of different data formats. A post processing section receives decommutated data from the primary decommutating transputer via transputer links and provides a post processed decommutated data output. The post processing section includes at least one post processing transputer for processing the decommutated data into post processed decommutated data. The primary decommutating transputer provides a secondary data output for cascading the data decommutator architecture with another data decommutator architecture to provide further levels of decommutation.

It is an advantage of the present invention that the decommutator can be modified through downloads from the host system. The data decommutator includes transputers which allow for a substantial amount of post processing to be performed before the data leaves the decommutator. Further levels of decommutation are provided by simply cascading an additional circuit card assembly to the primary circuit card assembly. Because each circuit card assembly is identical and each supports communications to another circuit card, production and maintenance costs are minimized.

It is a further advantage of the present invention that each circuit card assembly contain a transputer link switch and an external port so that the circuit boards may be connected one to another in a modular or cascading fashion. The boundaries of the data input and output are selected such that one board performs a complete level of data synchronization, data separation and data processing before the data is routed to a second circuit card assembly or to the host processor. If a second level of decommutation is to be processed, another circuit card assembly is connected to the initial circuit card. Further additional boards may be added to the configuration without requiring any modification to the existing boards. The only limitation to the number of circuit card assemblies that may be cascaded together is the host processor's capacity to support the assemblies.

It is yet another advantage of the present invention that the universal downloadable decommutator makes extensive use of field programmable gate arrays and transputers. Because of the flexibility of these devices, the circuit card assembly can be reprogrammed to perform many different functions. The field programmable gate arrays are integrated circuits capable of being programmed into logic gates, storage registers and counters to create custom designed logic functions. The gate arrays are programmed after power is applied to the circuit board from a microcode download from the host system. The field programmable gate arrays are programmed to form an external bus processor, a synchronization code correlator and a decommutator gate array to create the universal downloadable decommutator.

Specific applications for the data decommutator architecture of the present invention are given in co-pending application Ser. No. 07/820,501, entitled "Modular Distortion Correcting Real Time SSM/I Imagery Decommutator and Process for Producing Special Sensor Applied Meteorological Images", filed on an even date herewith and assigned to the Assignee of the present invention, the specification of which is herein expressly incorporated by reference.

Other objects, advantages and novel features of the present invention will become apparent from the following detailed description of the invention when considered in conjunction with the accompanying drawings.

BRIEF DESCRIPTION OF THE DRAWINGS

FIG. 19 is a block diagram illustrating the ingest module.

DETAILED DESCRIPTION OF THE DRAWINGS

Figure 1:
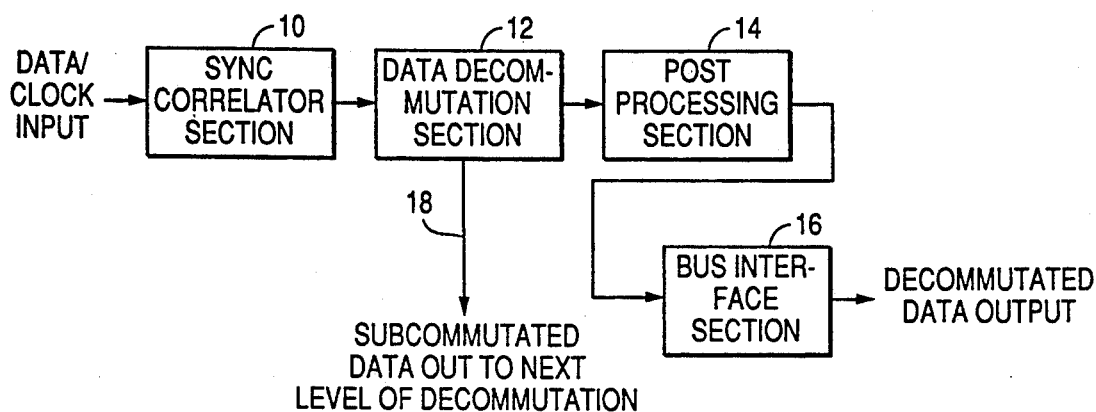
FIG. 1 is a block diagram illustrating the overall architecture of the universal downloadable decommutator.

Referring to FIG. 1, a high-level block diagram of the decommutator architecture includes a sync correlator section 10, data decommutation section 12, post processor section 14 and a bus interface section 16. The commutated data/clock input stream is fed to the sync correlator section 10. The decommutator architecture processes the input stream and provides a decommutated data output. The data decommutation section 12 further provides a subcommutated data output 18 which is provided to the next level of decommutation.

The sync correlator section 10 provides synchronization to the incoming data frames (commutated or subcommutated data) so that the decommutation section 12 can identify where to begin decommutating the data. The sync correlator section 10 recognizes both fixed sync words such as in the Defense Meteorological Satellite Program (DMSP) and METEOSAT or pseudonoise (PN) sync patterns such as Geostationary Operational Environmental Satellite (GOES), TIROS, and Geostationary Meteorological Satellite (GMS).

Figure 2:
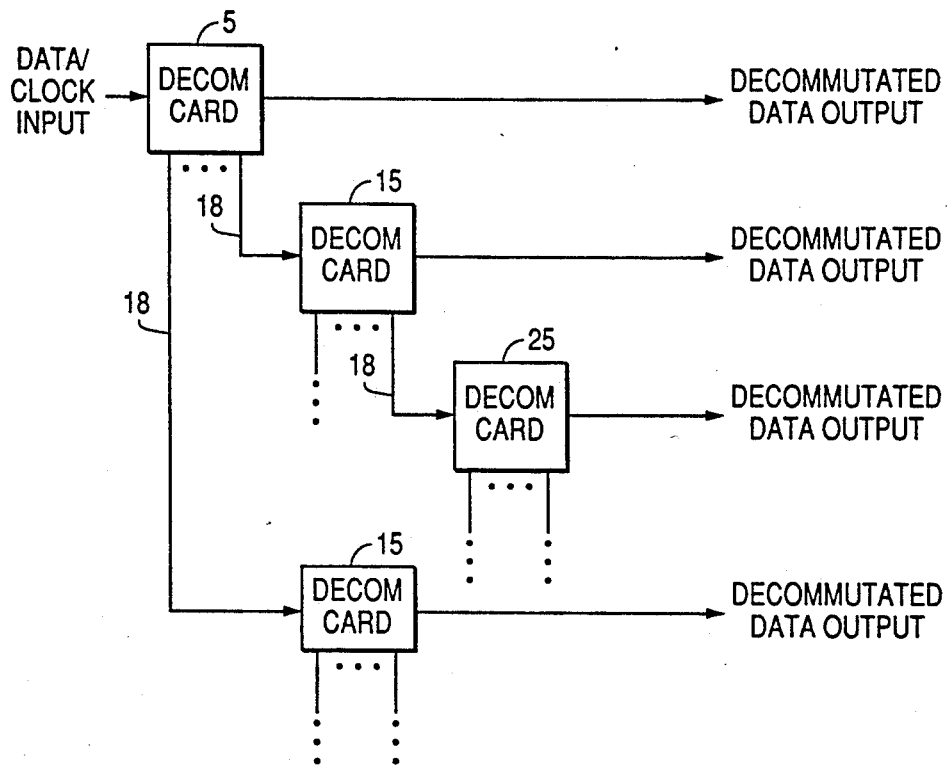
FIG. 2 is a block diagram illustrating the cascadability of the decommutator shown in FIG. 1.

The data decommutation section 12 separates the bit serial input data into variable length words e.g. 1 to 32 bits per word, and routes each word to the appropriate post processor section 14. Data can also be routed to a secondary output channel 18 for further decommutation. The further decommutation of the subcommutated output data 18 is performed by cascading identical decommutator circuit card assemblies as shown in FIG. 2. FIG. 2 illustrates a primary decommutator architecture 5, i.e. circuit card, (identical to FIG. 1) cascaded to two subcommutator architectures 15 for a second level of decommutation. One of the second level subcommutator architectures 15 is further shown cascaded to a third level subcommutator architecture 25. Each of the decommutator cards 5, 15, 25 have their output coupled to a host system's bus. The decommutator cards 5, 15, 25 are substantially identical.

Referring back to FIG. 1, the data decommutation section 12 is capable of extracting format information from the input data stream before starting decommutation. For example, frame type, frame length and word length are read from a GOES GVAR datablock.

The post processor section 14 provides various data processing functions and output file buffering and formatting. It is capable of processing several data types simultaneously, e.g. visual, multi-spectral IR, DOC, and grid data, and performing multiple functions on each specific data type, e.g. earth curvature correction and data decimation.

Finally, the bus interface section 16 allows the host system (not shown) to configure the decommutator 5 and also allow the post processor section 14 to transfer data to the host system.

Figure 3:
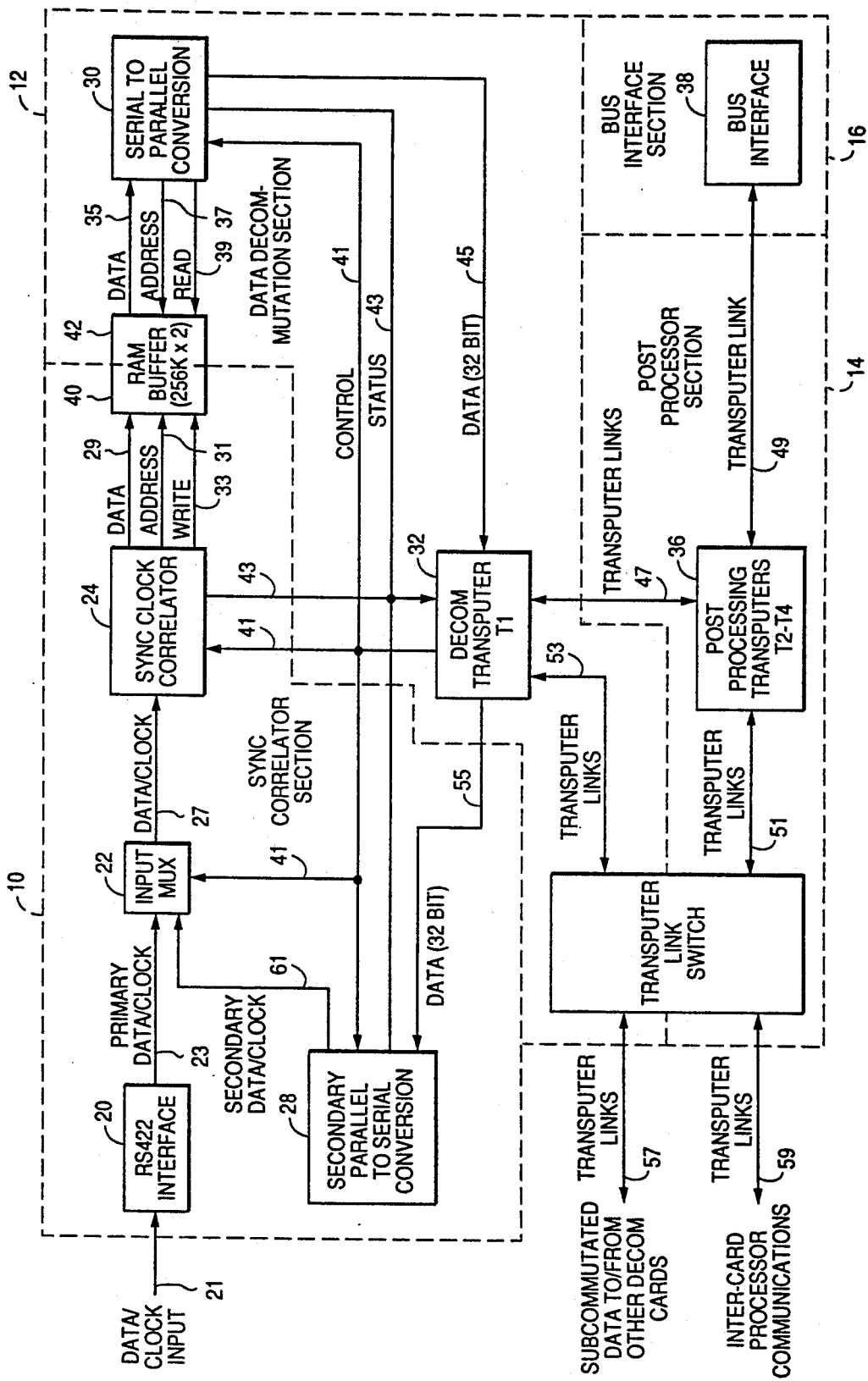
FIG. 3 is a functional block diagram of the universal downloadable decommutator architecture circuit card.

FIG. 3 is a functional block diagram illustrating the components within the sync correlator section 10, data decommutation section 12, post processor section 14 and bus interface section 16 of FIG. 1. Each of the sections 10, 12, 14, 16 are indicated via dashed lines in FIG. 3.

The sync correlator section 10 includes an interface circuit 20, i.e., a standard RS 422 interface, which receives the primary data/clock input stream 21. The interface circuit 20 couples the primary data/clock input stream 23 to an input multiplexer 22. A sync code correlator 24 receives the data/clock input 27 from the input multiplexer 22. The sync code correlator 24 provides a data output 29, address 31 and write signal 33 to a random access memory (RAM) data storage buffer 26. The sync code correlator section 10 further includes a secondary parallel to serial conversion circuit 28 which provides a secondary data/clock input 61 to the input multiplexer 22.

The data decommutation section 12 includes the RAM data storage buffer 26 which is shared with the sync correlator section 10, a serial to parallel data conversion circuit 30 which receives the data input 35 from the RAM data storage buffer 26 and provides an address 37 and read signal 39 to the RAM data storage buffer 26. Further, the data decommutation section 12 includes a general purpose microcomputer 32 containing hardware for parallel processing and synchronized interprocessor communications. For example, an INMOS ™ IMS T425 "transputer", which is a 32-bit CMOS microcomputer, may be used. The microcomputer 32, hereinafter referred to as a transputer, receives data input 45 from the serial to parallel conversion circuit 30 and can provide data output 55 to the secondary parallel to serial conversion circuit 28 in the sync correlator section 10. The transputer 32 provides control information 41 to the sync code correlator 24, input multiplexer 22, secondary parallel to serial conversion circuit 28 and the serial to parallel conversion circuit 30. The transputer 32 further receives status information 43 from the sync code correlator 24, serial to parallel conversion circuit 30 and the secondary parallel to serial conversion circuit 28.

The post processor section 14 is coupled via transputer links 53 and 47 to the transputer 32 in the data decommutation section 12. The post processor section 14 includes a transputer link switch 34 coupling, via transputer links 53, to the transputer 32 and several post processing transputers 36 (labeled in FIG. 3 as transputers T2-T4). The post processing transputers 36 are coupled via transputer links 47 to the transputer 32 in the data decommutation section 12. The post processing transputers 36 are also coupled to the transputer link switch 34 via transputer links 51. The transputer link switch 34 includes a secondary data input/output bus 57 and an intercard processor communication bus 59.

The bus interface section 16 includes a bus interface circuit 38 which is coupled via transputer links 49 to the post processing transputers 36 in the post processor section 14. The bus interface circuit 38 couples with a host computer (not shown).

The four main sections 10, 12, 14, 16 of the decommutator architecture operate to synchronize the incoming data stream, split the incoming data stream by type of data, process and buffer the data, and then interface to the host system's bus.

The sync correlator section 10 receives the serial input data and locates the sync pattern in the input data. After the sync pattern is located, the data is stored in the RAM data storage buffer 26. The RAM data storage buffer 26 includes two storage banks 40 and 42. The data is first stored in bank 40 until the end of the data frame is located. When that occurs, bank 40 is switched to the data decommutation section 12 and data bank 42 becomes the input buffer. The sync correlator section 10 then looks for the next sync pattern and the process is repeated.

The data decommutation section 12 begins decommutating the data from data bank 40 while the sync correlator section 12 is storing the next frame in data bank 42. The serial data from the data storage buffer 26 is converted to variable length words under the control of the transputer 32. The serial to parallel converter circuit 30 is dynamically configured via the transputer 32 based on data type and program code within the transputer's memory. The data type is identified by its location within the frame and the particular frame type. The data words are read over data bus 45 and buffered in the transputer 32. Each data block is tagged and then sent over transputer links 47 to the appropriate post processing transputer 36.

Alternatively, the data blocks can be sent over transputer links 53 through the transputer link switch 34 to be further decommutated through output bus 57.

The post processing transputers 36 buffer the incoming data blocks into their local RAM memory. Each of the processors has one or more processes to input, manipulate and output the data.

The bus interface circuit 38 allows the data from the post processing section 14 to be placed on the host system's bus.

Each of the sections of the decommutator architecture are designed to be generic and can be programmed to decommutate any synchronous serial data stream. This allows the decommutator architecture of the present invention to accommodate any future changes in data formats by simply downloading different software to appropriately configure the decommutator.

Figure 4:
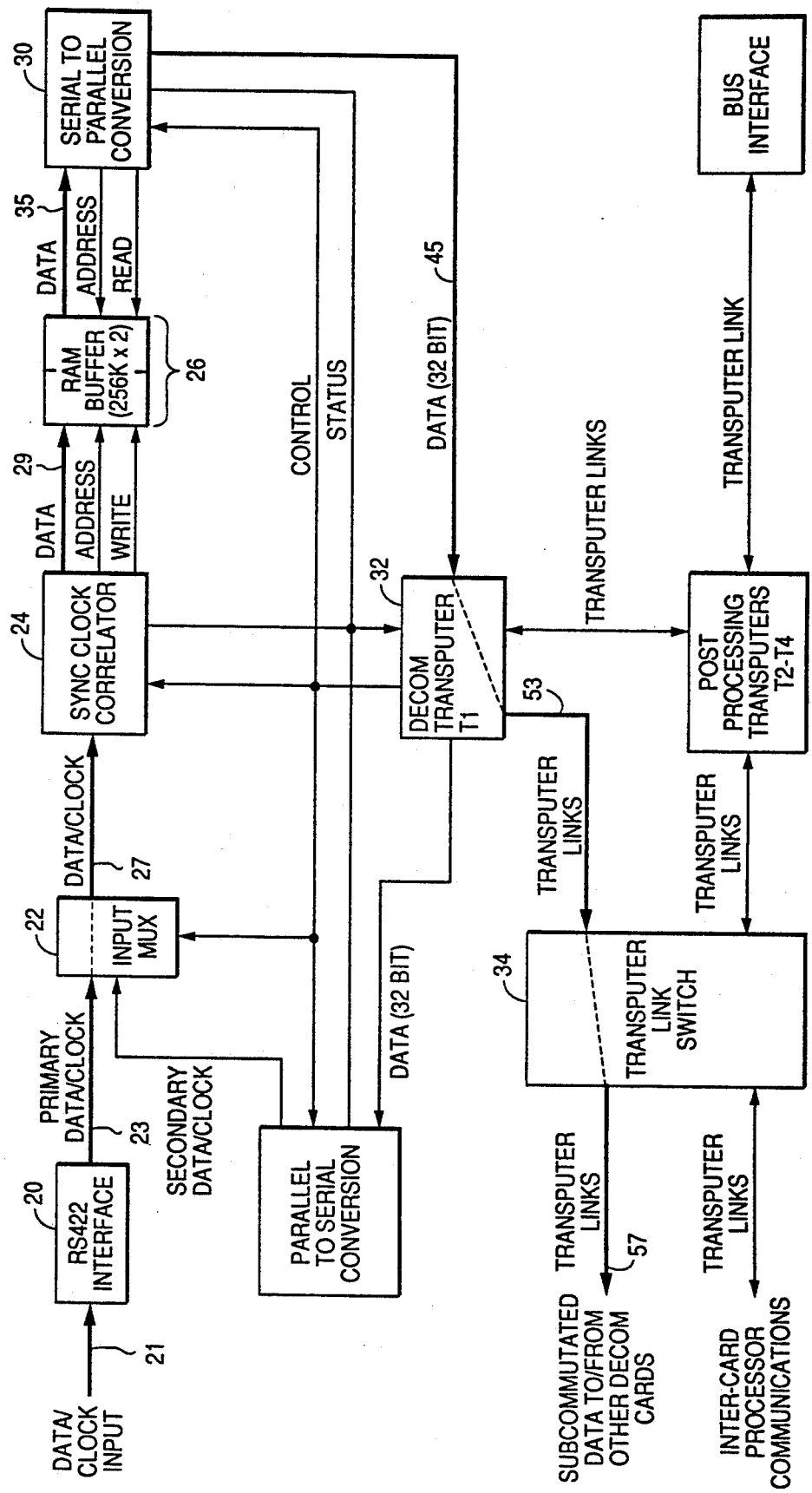
FIG. 4 is a functional block diagram of the primary data flow through the architecture of FIG. 3 illustrating the routing for subcommutated data.

Referring to FIG. 4, there is shown a functional block diagram of the decommutator circuit card assembly illustrating the data flow through the assembly for primary data which is to be further subcommutated as shown with respect to FIG. 2 and decommutator cards 5 and 15. The data flows through the system as indicated via arrows 21, 23, 27, 29, 35, 45, 53 and 57. The data is routed from the interface circuit 20 to the sync correlator 24. The sync correlator 24 performs a bit-by-bit search for a data format defined frame sync pattern. The synchronized data is then stored in the RAM data storage buffer 26. The serial to parallel conversion circuit 30 converts the serial data stream to parallel data. The transputer 32 builds a secondary file of data which is extracted from one primary line. The secondary file of data is then routed through the transputer link switch 34 to the next level of subcommutation. The secondary file of data 57 is provided to a corresponding secondary data input 57 on a further decommutator circuit card as shown with respect to FIG. 5.

Figure 5:
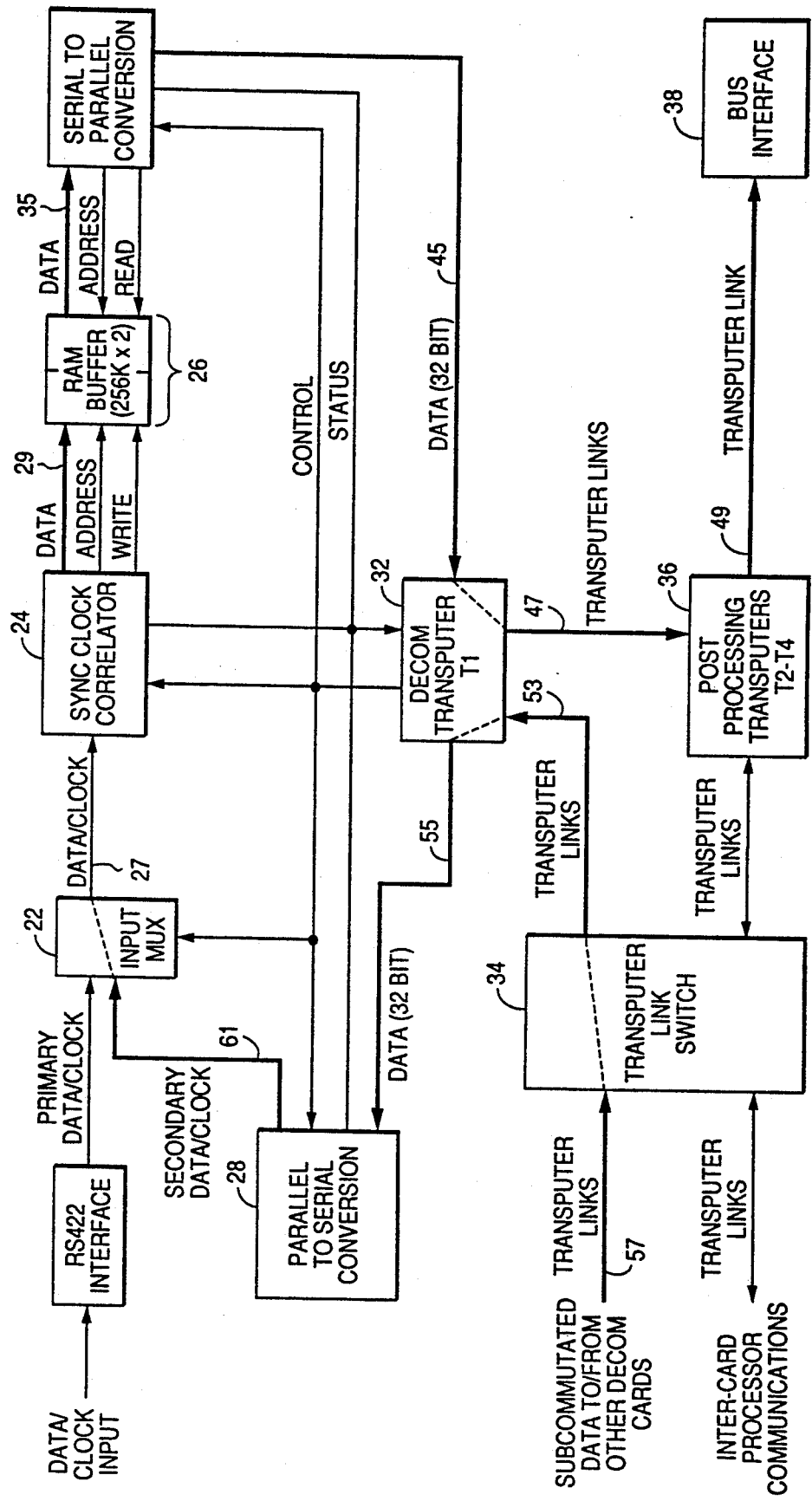
FIG. 5 is a functional block diagram illustrating secondary or subcommutated data flow through the architecture of FIG. 3.

In FIG. 5, the secondary file of data 57 is received via the transputer line switch 34 and passed to the transputer 32 as indicated via 53. From the transputer 32, the data flows to the secondary parallel to serial conversion circuit 28. Next, the secondary data is delivered in serial format to the input multiplexer (MUX) 22. From the input MUX 22, the data passes through the sync code correlator 24, data RAM storage buffer 26, serial to parallel conversion circuit 30 and back to the transputer 32. The sync correlator 24 again performs a bit-by-bit search for a predetermined block sync pattern. Because no further subcommutation of the data is to occur, the transputer 32 delivers the data via transputer links 47 to the post processing transputers 36. From the post processing transputers 36, the data is passed via transputer links 49 to the bus interface 38 and eventually to the host system.

Together, FIGS. 4 and 5 illustrate the data flow through a primary decommutation circuit card and a secondary decommutation circuit card. It is understood by those skilled in the art that further sublevels of decommutation may occur as indicated in FIG. 2.

Each of the individual component blocks within the decommutator architecture of FIG. 3 will now be discussed.

Figure 6:
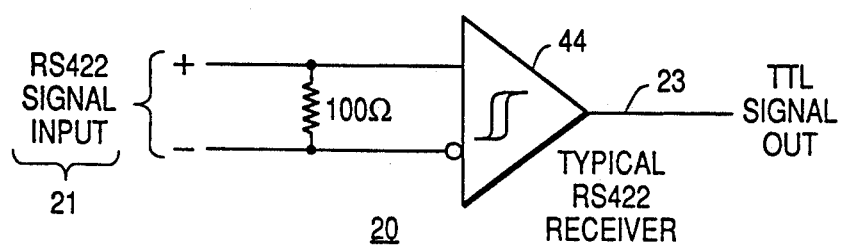
FIG. 6 is a schematic block diagram of the input data interface circuit.

FIG. 6 is a schematic block diagram of the interface circuit 20. A receiver 44, preferably an RS 422 receiver, receives the positive and negative RS 422 signal inputs 21. A resistor is coupled across the input terminals of the receiver 44 to provide signal termination. The receiver 44 then provides the data output signal 23, for example, as a transistor-transistor logic (TTL) signal output.

The data output from the interface circuit 20 of FIG. 6 is provided to the input MUX 22. The input MUX 22 allows the sync correlator 24 to select either the primary, i.e. external (FIG. 4), data or the secondary, i.e. internal (FIG. 5), data. Alternatively, the input MUX 22 can be configured to pass self-test data to the sync correlator 24.

Figure 7:
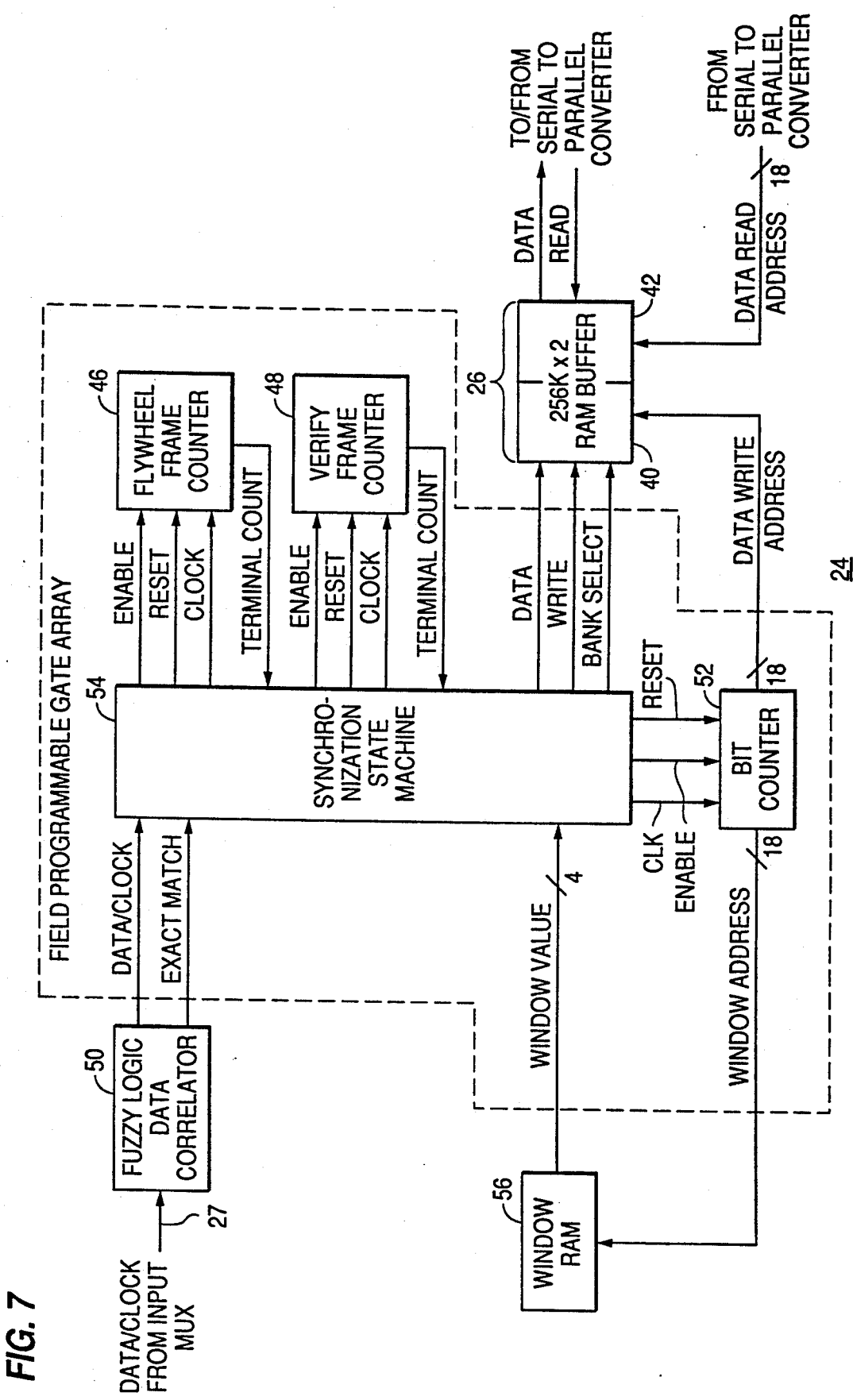
FIG. 7 is a functional block diagram of the sync code correlator.

FIG. 7 is a functional block diagram of the sync code correlator 24. The sync code correlator 24 includes a fuzzy logic data correlator 50 which receives the data/clock input from the input MUX 22 (FIG. 3). The fuzzy logic data correlator 50 is programmable to search the input data stream for a particular frame sync pattern. The data/clock input is also provided to a synchronization state machine 54. The synchronization state machine 54 further receives a "match" signal from the fuzzy logic data correlator 50 to indicate a match of the incoming data stream to the particular programmed pattern with fewer than the programmed number of errors. A window RAM block 56 is also coupled to the synchronization state machine 54. The window RAM 56 contains values indicating: 1) where the anticipated sync pattern should be located within the incoming data stream; 2) the number of "bit slips" allowed before and after the anticipated sync pattern location; and 3) a sync lost location within the incoming data stream.

A bit counter 52 is coupled to both the synchronization state machine 54 and the window RAM 56. The bit counter 52 counts the number of data bits in a current frame of data. The bit count is used as an address when writing the data to the RAM data storage buffer 26.

A verify frame counter 48 is also coupled to the synchronization state machine 54 and counts the number of verify frames encountered in the input data stream before entering a frame-lock condition.

A flywheel frame counter 46 couples with the synchronization state machine 54 and counts the number of flywheel frames encountered in the input data stream before the state machine 54 re-enters a search mode of operation.

The synchronization state machine 54 operates to establish a sync lock after a predetermined number, for example 2 to 255, of error free sync patterns have been received. Once sync lock is established, the state machine 54 increases an error threshold and enables a programmable bit slip window. The programmable bit slip window allows sync to occur "n" bits before or after the anticipated sync location, for example n=2 for primary data. The state machine 54 operates to "flywheel" for a certain number of frames (up to 255 possible) once the sync code correlator 24 loses sync. The state machine 54 further aligns the input data to the sync pattern and writes the data to the temporary RAM data storage buffer 26. The synchronization state machine 54 further controls the bank selection, i.e. 40 or 42, of the RAM data storage buffer 26 via a bank select signal. The RAM data storage buffer 26 is preferably a 256K×1 storage buffer holding temporary data. The sync code correlator 24 fills one buffer bank while the serial to parallel conversion circuit 30 reads from the other buffer bank.

The sync code correlator 24 allows for bit-by-bit searching for frame/block sync patterns. It is fully programmable for various sync patterns, sync lengths, sync locations and error thresholds.

The sync code correlator section 10 provides synchronization to the incoming data stream. The correlator section 10 searches for a sync word or a pseudo noise (PN) pattern. Upon detecting a sync code, the correlator saves a frame of data in the RAM data storage buffer 26 for subsequent processing by the transputer 32.

The sync correlator 24 can pass bit error counts and bit slip information to the host processor via the data decommutation section 12. This information is useful for providing data quality monitoring.

The main logic for the sync code correlator 24 is a field programmable gate array. The use of a field programmable gate array allows for maximum versatility of the correlator. The field programmable gate array can be configured as a sync correlator or a PN correlator via program downloading from the host system. If the correlator is used as a PN correlator, the fuzzy logic data correlator is not necessary.

Figure 8:
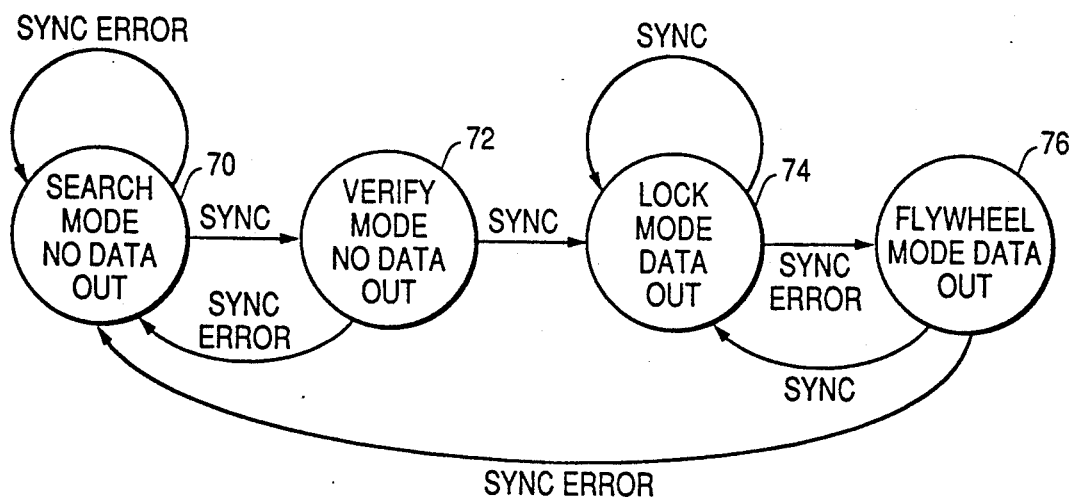
FIG. 8 is a flow diagram for the sync correlator state machine.

The synchronization state machine 54 operates in four major modes: search, verify, lock, and check (flywheel). A flow diagram for the synchronization state machine 54 is given in FIG. 8 illustrating the four modes of operation.

Before sync is established, the sync correlator operates in the search mode to find the required sync pattern. None of the data input to the sync correlator 24 is output to the RAM data storage buffer 26 during the search mode. If a possible sync pattern is found, then the state machine enters the verify mode and closes, i.e. shortens, the window in the window logic 56.

In the verify mode of operation 72, the sync pattern found in the search mode is verified by looking for more sync codes in their expected locations. The number of verify cycles and the number of allowable errors in the verification cycles are programmable. If the next sync pattern is found to be in error by the verification mode 72, the state machine returns to the search mode 70.

Once the verify mode 72 is passed, the state machine enters the lock mode 74 in which decommutation of the input data begins. The sync correlator continues to check the sync patterns while in the lock mode 74. Also during the lock mode 74, the data is output to the RAM data storage buffer 26. If during the lock mode 74, a sync pattern is found one or two bit positions away from the expected sync location, a bit slip is indicated and sync is re-established at the new sync location. If, however, a sync pattern is not found within several bits of the expected sync location, then the state machine enters the check (flywheel) mode of operation 76.

During the check mode 76, if a sync pattern is found within a specified number of frames, then the state machine reverts back to the lock mode 74. However, if a sync pattern is not found within the specified number of frames, then a sync error has occurred and the state machine reverts back to the search mode 70. During the check mode 76, the data is also output to the RAM data storage buffer 26.

Referring back to FIG. 7, the bank select signal from synchronization state machine 54 toggles memory banks 40 and 42 between the sync correlator section 10 and the data decommutation section 12. Frame sync is passed to the decommutation section 12 to signal the beginning of a valid frame.

Figure 9:
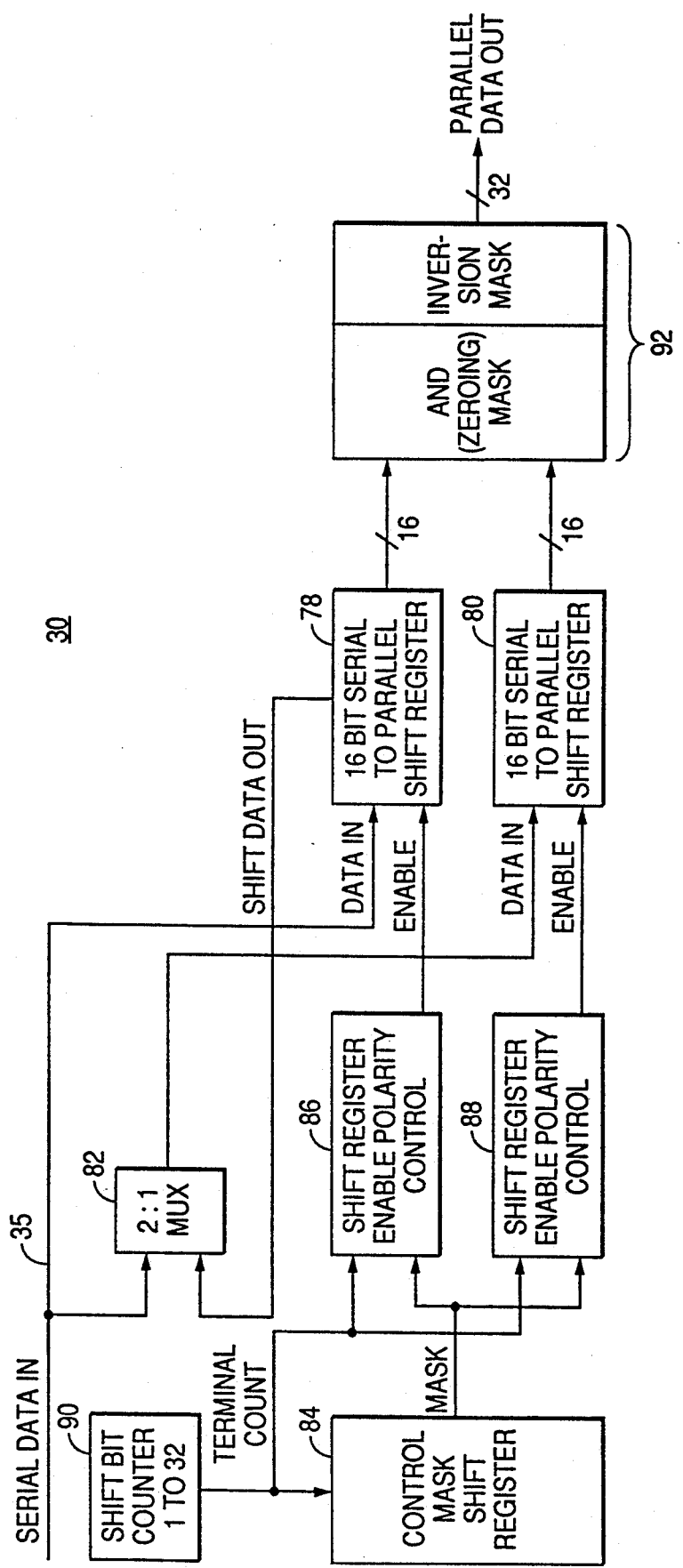
FIG. 9 is a functional block diagram of the serial to parallel conversion circuit.

FIG. 9 shows a functional block diagram of the serial to parallel conversion circuitry which reads the synchronized serial data from the RAM data storage buffer 26. The serial data input 35 is provided to a serial to parallel shift register 78, e.g. a 16-bit serial to parallel shift register. The serial data stream is also provided to a multiplexer 82 which has as its other input the shift output from shift register 78. The multiplexer 82 provides an output to the input of a second serial to parallel shift register 80. The parallel outputs of each shift register 78 and 80 are concatenated together to form a longer word output. The output word is then passed through an inversion and zeroing mask 92 before being output to the transputer 32 (FIG. 3). For example, using two 16-bit serial to parallel shift registers 78 and 80, a 32-bit word may be output. A shift bit counter 90 provides a terminal count output to a control mask shift register 84, a shift register enable polarity control 86 and a shift register enable polarity control 88. The shift bit counter 90 receives its control signals from the transputer 32 (FIG. 3). The control mask shift register 84 provides a mask output to each of the polarity control shift register enables 86 and 88. The output from shift register enable polarity control 86 provides an enabling input to the serial to parallel shift register 78. Likewise, the output from shift register enable polarity control 88 provides an enabling input to the serial to parallel shift register 80. While the terminal count output from the shift bit counter 90 remains low, the polarity controls and hence the shift registers are enabled.

The serial to parallel conversion circuit 30 allows for a programmable word size, e.g. up to 32 bits long. Alternatively, the serial to parallel conversion circuit 30 can be configured to provide two 16-bit word outputs rather than one 32-bit word. The programmable nature of the decommutator architecture allows for programmable data inversion, data zeroing and shift masks to be used. The programmable shift mask allows for skipping of non-data locations and de-interleaving of interleaved data.

Figure 10:
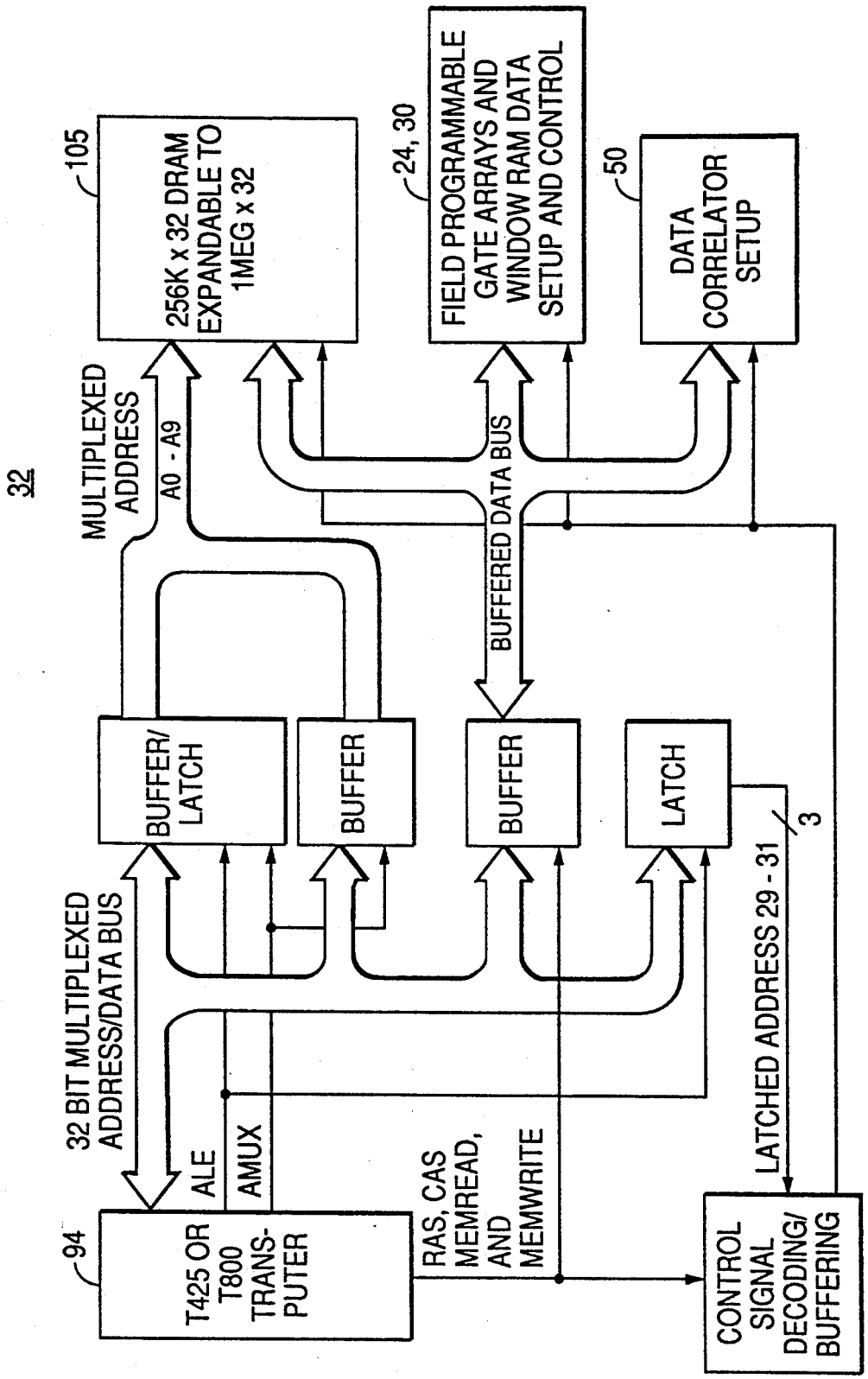
FIG. 10 is a functional block diagram of the decommutator transputer.

FIG. 10 is a functional block diagram of the transputer 32 for performing the decommutation. The decommutation process is controlled via the transputer 94. The process is based on either format-specific look-up tables with generic decommutation software, or on format-specific decommutation software. These are loaded in the transputer's memory 105. The use of a transputer for performing the decommutation allows parallel processing capabilities, synchronized serial communications, and fast instruction cycles. The transputer also requires only minimal support logic, thereby simplifying the overall decommutation architecture. As noted above, a preferred transputer is the INMOS IMS T425 transputer which is a 25 MHz, 32-bit risc-type processor. It is preferable to configure the transputer with a megabyte of memory which can be expandable up to four megabytes. The transputer 94 provides a number of high-speed interprocessor links for transferring data. It also provides set-up and control of the fuzzy logic data correlator 50, window logic 56, and the field programmable gate arrays 24, 30 used in the decommutator architecture. Likewise, the transputer is capable of reading data and status from the fuzzy logic data correlator 50, window logic 56, and the field programmable gate arrays.

Figure 11:
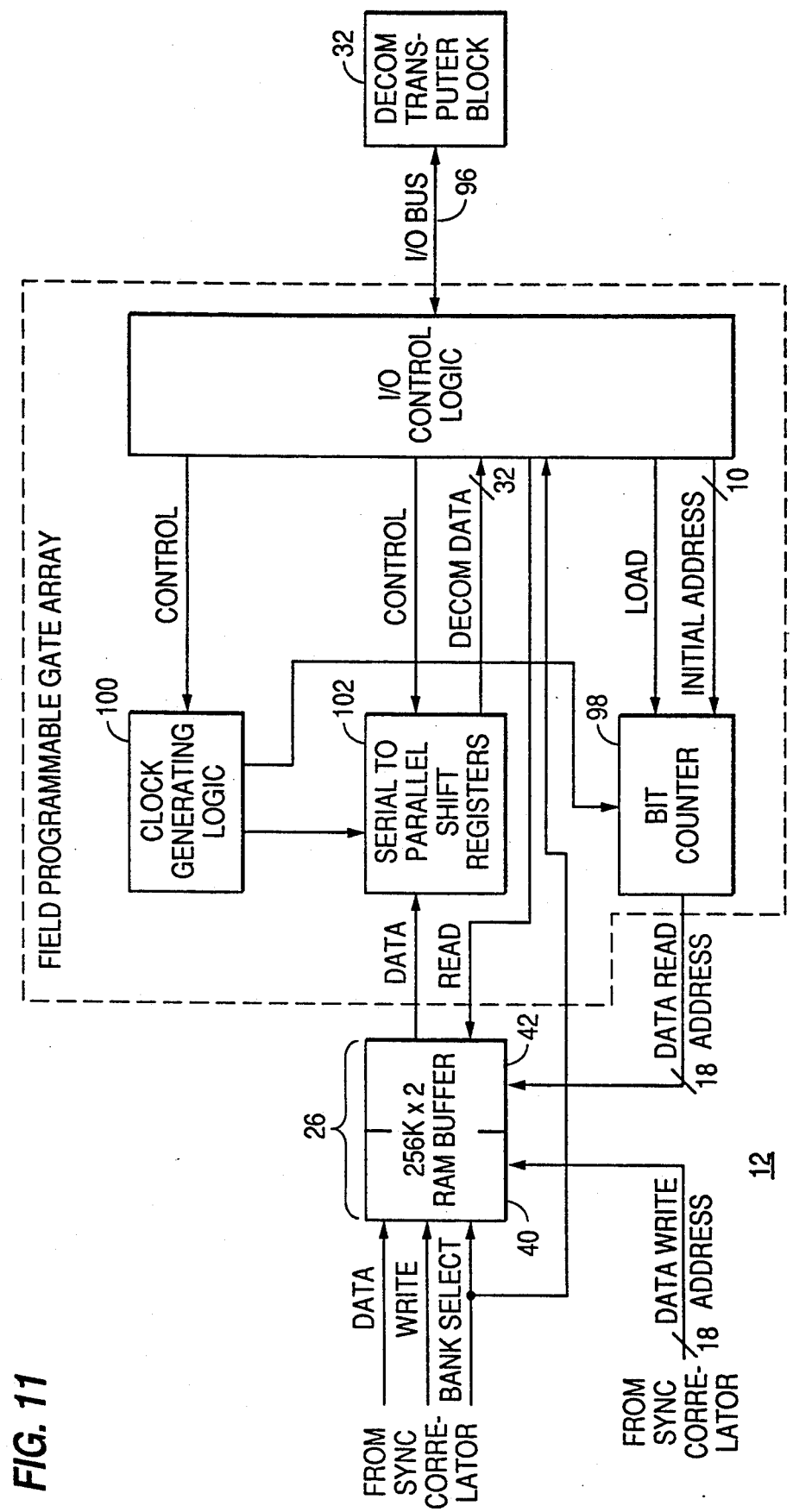
FIG. 11 is a functional block diagram of the data decommutation section.

Referring to FIG. 11, the interfacing of the transputer 32 within the data decommutation section 12 is shown. The data decommutation section 12 receives the serial input data from the RAM data storage buffer banks 40, 42 and divides it into various data types. The data is then routed to the proper post processor within the post processing section 14 for further processing and file formatting. The transputer 32 can be programmed to read format information, such as frame type and frame count, from the input data and to process the data based on this information.

The transputer 32 dynamically controls the serial to parallel converter circuit 30 via a memory mapped input/output (I/O) bus 96. First, the transputer sends the address of a word or block of words to the address counter 98. Next, the transputer sets up the bit inversion, data zeroing, and shift register mask registers. Then the transputer 32 sets the clock generator logic 100 for the preferred word size and signals the clock generator logic 100 to shift data from the RAM data storage buffer banks 40, 42 into the shift register 102. Transputer 32 polls the parallel to serial converter 30 in order for the transputer 32 to read the data from the shift registers 102. After the transputer 32 reads a word from the shift register 102, the transputer 32 stores the word in a buffer (see FIG. 10) for block direct memory access (DMA) transfer to the post processor section 14 over a transputer link.

As noted with respect to FIG. 10, the transputer 94 in the transputer block 32 interfaces with the field programmable gate arrays in order to transfer logic set-up information. The transputer also reads status information from the sync correlator section 10 and the decommutation section 12 for its own use as well as to pass on the status information to the host system.

In operation, for example, when decommutating DMSP smooth data, the data decommutation section 12 de-interleaves thermal and light data using the control shift mask register 84 and the shift register enable polarity control 86 and 88 and strips the eighth thermal bit from the light data and reinserts it in the thermal data. The address counter 98 can be programmed to count either up or down to account for data direction. The data decommutation section 12 will also decomplement inverted video and telemetry data as well as provide line reversal capabilities.

Figure 12:
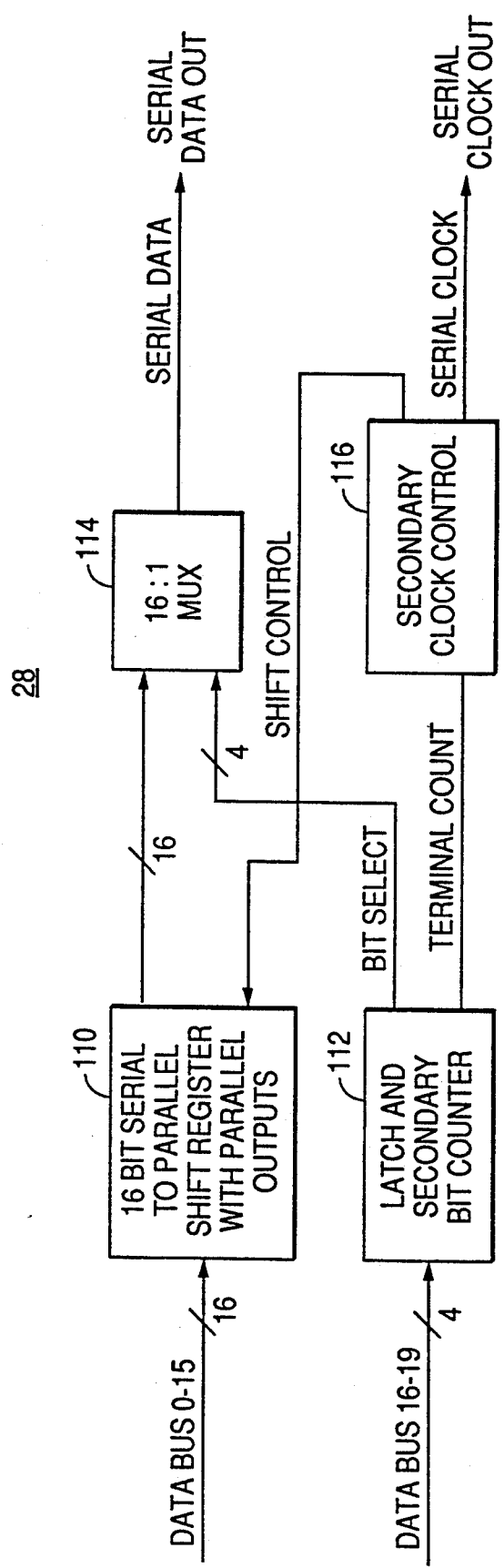
FIG. 12 is a functional block diagram of the secondary parallel to serial conversion circuit.

FIG. 12 is a functional block diagram of the secondary parallel to serial converter 28. The secondary parallel to serial converter circuit 28 includes a parallel to serial shift register having parallel outputs 110, which receives input data over the input data bus. A latch and secondary bit counter 112 14 is provided which receives a bit count on the data bus, bits 16–19, and provides an input to a multiplexer 114. The parallel output from the parallel to serial shift register 110 is also provided as an input to the multiplexer 114. The latch and secondary bit counter 112 provides a 4-bit enabling code to the multiplexer 114 which selectively allows each of the parallel output bits from shift register 110 to be serially output as shown over the serial data out-line. The latch and secondary bit counter 112 further provides a terminal count input to a secondary clock control 116. The secondary clock control 116 provides a secondary clock output and a shift control output which is coupled to the parallel to serial shift register 110. The shift control output allows the circuitry to automatically adjust the parallel to serial shift register size, for example, from 1 to 16 bits. The serial data out and secondary clock out signals are provided to the input MUX 22 (see FIG. 3) for synchronization. The conversion circuit can further provide a routing of the secondary decommutated data back to the input MUX 22 for synchronization as shown with respect to FIG. 5 below.

Referring to FIG. 1, the post processor section 14 receives data from the data decommutation section 12 and performs various processing functions, buffers the data for output, and sends the data to the bus interface. Each of the transputers 118, 120, 122 and 124 as shown in the transputer configuration diagram (FIG. 14) are programmed to process one or more specific data types. All data blocks from the data decommutation section 12 start with an identification tag to identify the data and the block size. A link switch 34 provides high speed, for example 1.3 Mbytes/sec, transputer link switching and allows interprocessor and interboard communications. The link switch 126 further provides reconfigurable switching capabilities during the decommutation process.

Figure 13:
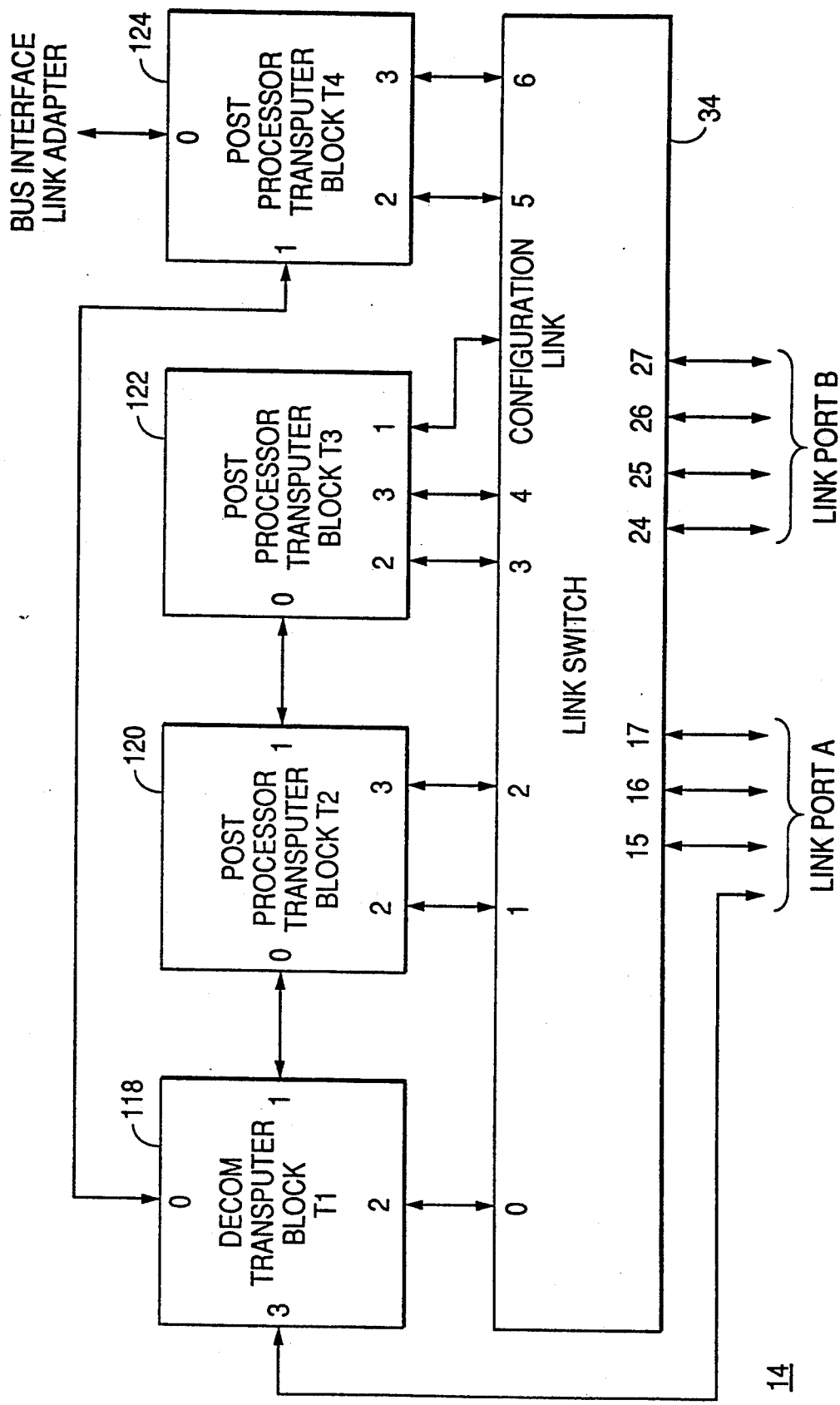
FIG. 13 is a functional block diagram of the transputer link switch.

As shown in FIG. 13, each of the transputers 118–124, in the post processor section 14, is connected to the other post processor transputers, and to the main data decommutation transputer 32 (FIG. 3). Transputer 124 is connected to the bus interface via serial to parallel link adapters (not shown). The link adapters allow the transputers to communicate with the host system and to send data over the host system's bus. Similarly to the data decommutation transputer 32, the post processor transputers 118–124 can be, for example, INMOS models IMS T425 (integer) or T805 (floating point) transputers.

Figure 14:
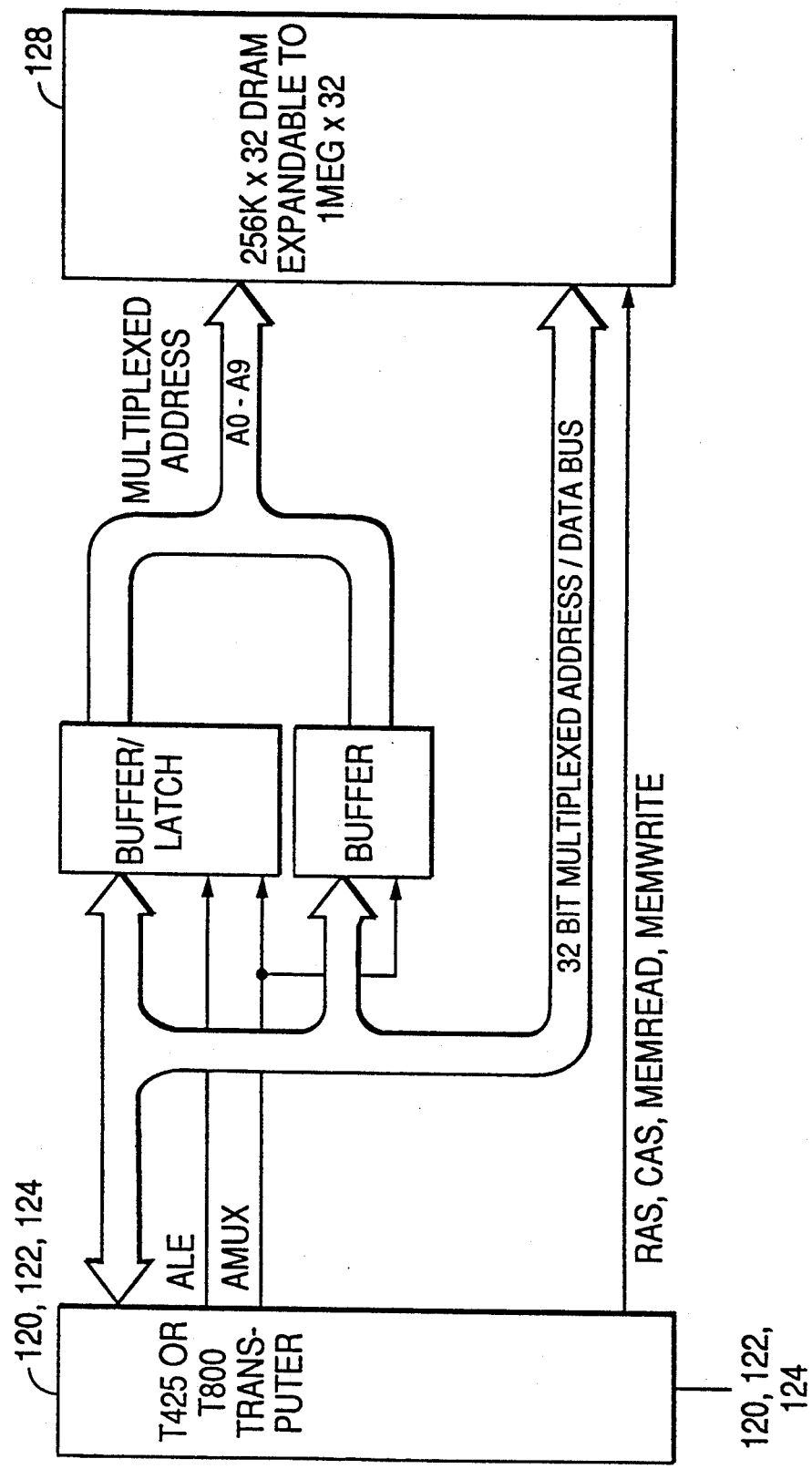
FIG. 14 is a functional block diagram of the post processing transputers.

Referring to FIG. 14, there is shown a functional block diagram for the data processing transputers 118–124. Data from the data decommutation section 12 is DMA transferred into a post processing transputer's local memory 128 through a transputer link. After a block of data is transferred, the transputer 118–124 processes the data. The processed data is then DMA transferred to the bus interface section 16. It will be understood by those skilled in the art that one or more of the post processing transputers 118–124 can be eliminated for cost-sensitive applications where less processing power is required.

The bus interface section 16 functions as a bus transceiver/translator between the post processor link adapter (not shown) and the host processor (not shown). This interface is responsible for providing all of the proper handshaking required to perform the block transfers of data into and out of the decommutation architecture. During initialization, the bus interface section 16 provides the data paths and control signals required for the host processor to transfer the decommutation architecture load information.

The bus interface section 16 can be of the type which provides hardware emulation of Digital Equipment Corporation's Model DRV 11-W/A DMA interface which provides an interface to the Digital Equipment Corporation's Q-bus. The bus interface is software compatible with the DEC DRV 11-W/A software driver and can have a burst rate up to 1.7 Mbytes/sec.

Figure 15:
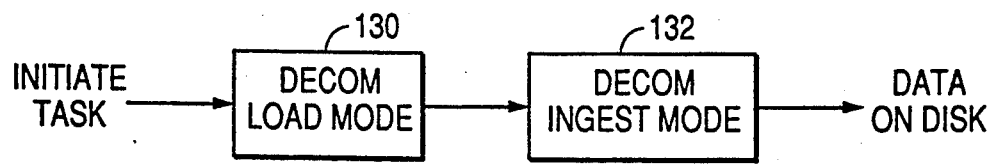
FIG. 15 is a top level software flow diagram for the universal downloadable decommutator.

Referring to FIG. 15, there is shown a top level software flow diagram illustrating both the load mode 130 and ingest mode 132 for the decommutation architecture. The load mode 130 is entered by initiating the decommutation task and is responsible for initializing the decommutation architecture. The ingest mode 132 is entered after completion of the load mode 130. The ingest mode 132 performs decommutation of data, post processing, and transfer of data to the host system.

Figure 16:
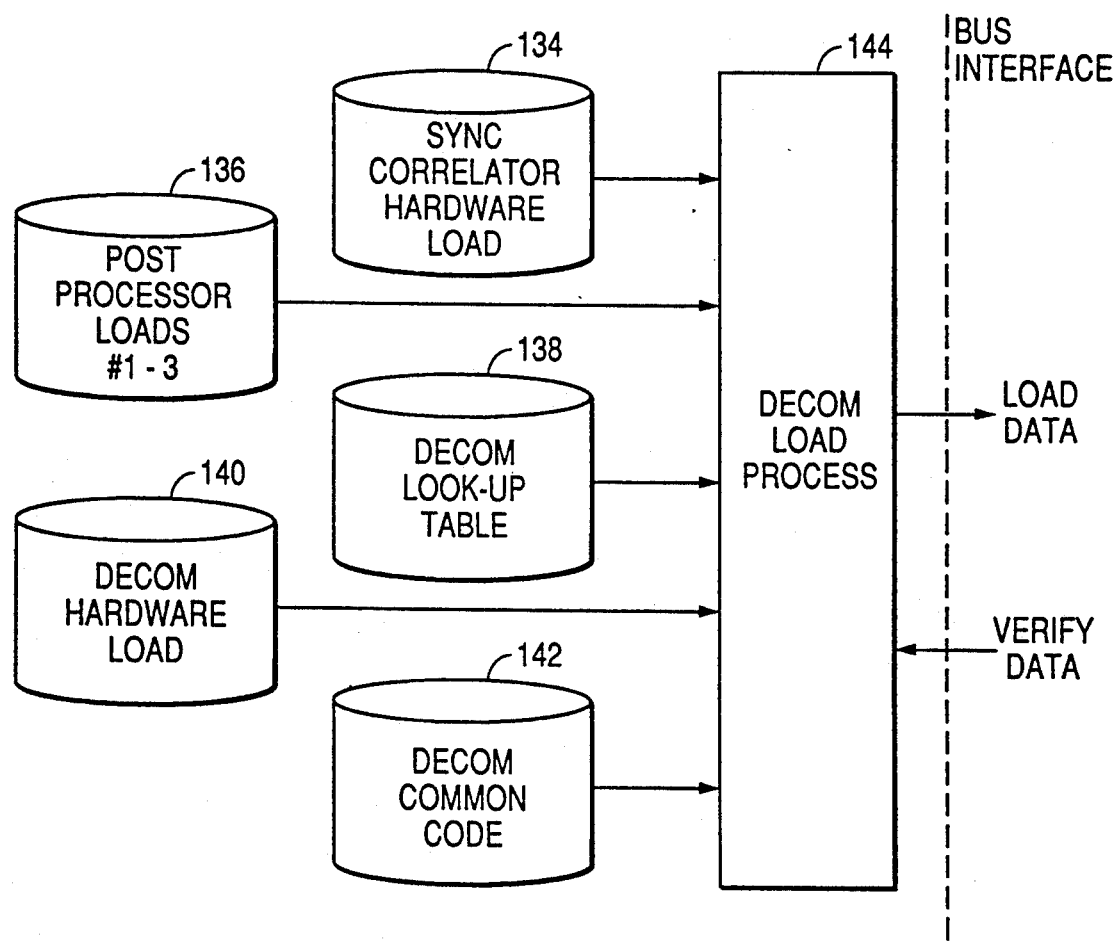
FIG. 16 is a block diagram illustrating the decommutator load process.

FIG. 16 illustrates the decommutation load process 144 and the load files 134–142 that are transferred to the decommutation architecture. The load process is also capable of verifying the data loaded into the decommutation architecture.

The sync correlator hardware load 134 and the decom hardware load 140 provide logic configuration data for the field programmable gate arrays in the decommutation architecture. The field programmable gate arrays are programmed by sending the load data to the decommutation transputer (32 in FIG. 3). This load data is prefixed by the decom common code 142 that directs the transputer 32 to program the field programmable gate arrays.

The field programmable gate array loads are stored in separate load files. The load process 144 reads and transfers the appropriate files for a given data format. New data formats are easily accommodated by adding new load files.

New field programmable gate array load files are generated by entering a logic diagram for the new sync correlator or decommutator into a schematic capture program. The schematic file is translated to a field programmable gate array compatible file using software provided by the gate array manufacturer.

The decommutator and post processor transputer load files 138, 142 and 136 contain the code required to perform the decommutation and post processing functions. The transputers have a built-in boot function and are loaded via their transputer links. The transputer loads are stored in separate files. The load process reads and transfers the appropriate files for a given data format. New data formats are easily accommodated by adding new load files.

It is preferable that the transputer load files be written in the OCCAM computer language supplied by the transputer manufacturer, INMOS. This language is optimized for parallel processing and synchronized interprocessor communications.

Figure 17:
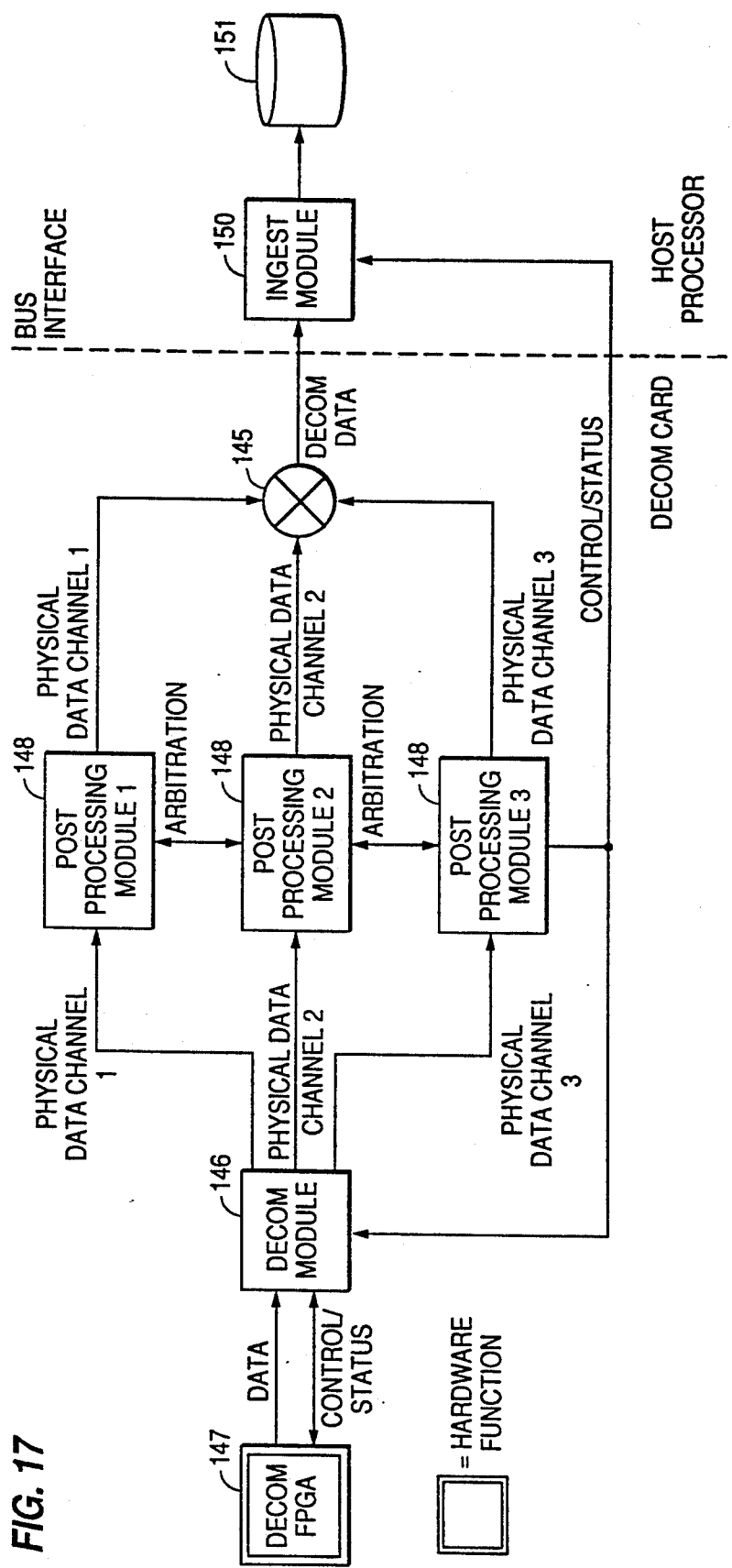
FIG. 17 is a top level block diagram illustrating the decom ingest software configuration.

Referring to FIG. 17, a top level decommutator ingest software configuration is shown. The ingest software consists of a decommutator module 146 which is coupled to configure the field programmable gate arrays 147, post processing modules 148 which receive physical data from the decom module 146, and an ingest module 150 for the host processor, which stores the ingested data in a storage medium 151. The decom 146 and post processing 148 modules execute on the decommutator architecture while the ingest module 150 executes on the host processor. A data multiplexing function 145 receives the data from the post processing modules 148 and provides it to the ingest module 150.

Figure 18:
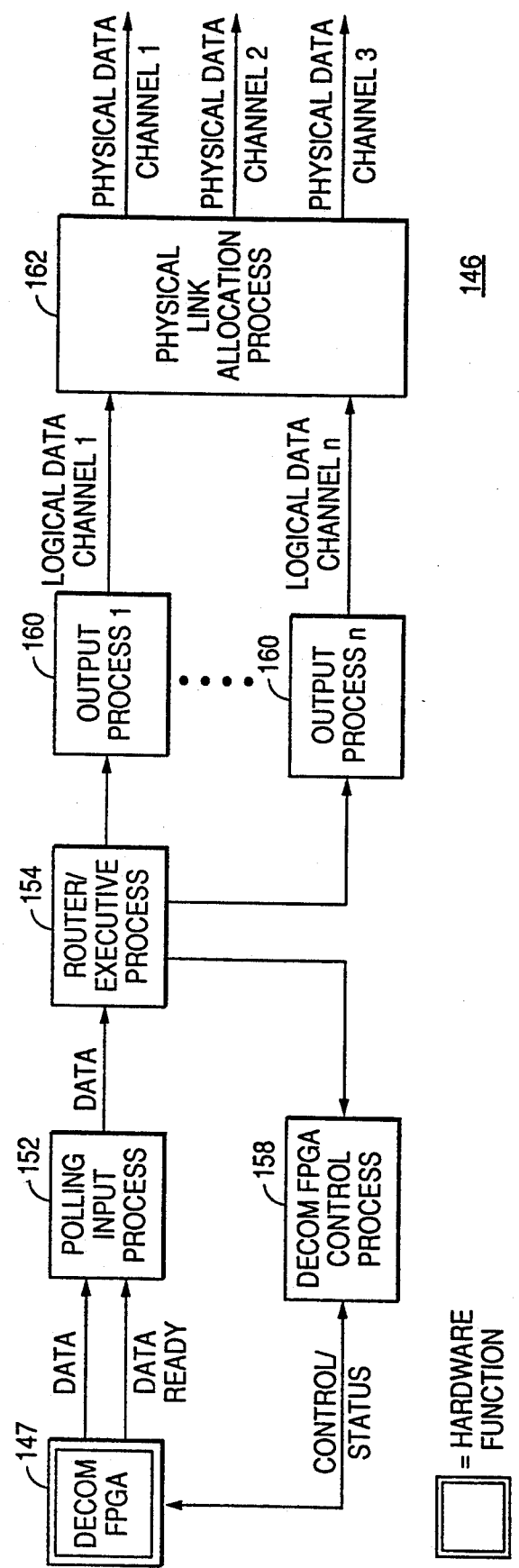
FIG. 18 is a block diagram illustrating the decommutator module.

FIG. 18 is a more detailed diagram of the software processes contained in the decom module 146. The processes read data from the decommutator architecture, control the decommutator architecture hardware, and perform the data decommutation functions.

An input process 152 retrieves data from the decommutator hardware 147 and passes the data to a router/executive process 154. A decommutator field programmable gate array control process 158 provides real-time status and control to the decommutator hardware 147.

The router/executive process 154 interprets routing and control commands from a look-up table 156 of the other processes in the decom module 146. The router/executive process 154 is responsible for passing control and status information between the decom transputer and the host processor.

Output processes 160 buffer and transfer decommutated data to the post processor via a physical link allocation process 162. One output process 160 is required for each decommutated data type. The physical link allocation process 162 multiplexes data from the output processes 160 onto the physical transputer links.

FIG. 19 illustrates the processes required for the ingest module 150. These processes are responsible for identifying the incoming data, storing the data in a storage medium, and coordinating the decommutation/ingest functions. This module operates on the host system and, for example, can be written in "C" and/or assembly language.

Interrupt service procedures 180 identify the type of data to be received in the next block transfer from the decommutator architecture. This identification is accomplished through the use of a unique block header for each data type. An ingest process 174 has the control functions transferred to it after identifying the interrupt. The ingest process 174 transfers data from the decommutator architecture to file buffers 182 and storage devices 151 using standard system calls.

A control/status process 176 coordinates the activities of the ingest 150, decom 146, and post processing 148 modules. A user interface 178 provides a means to configure and monitor the ingest system 150.

The universal downloadable decommutator architecture of the present invention performs synchronization, one level of decommutation, and post processing. Further, the circuitry is cascadable to perform sync pattern recognition, decommutation, post processing, and bus interfacing of subcommutated data streams as well. The architecture uses field programmable gate arrays for the sync logic and transputers in the data decommutation and post processing sections for programmability and parallel processing speed. The architecture can be used for GOES GVAR, GMS, METEOSAT, TIROS HRPT, and DMSP. It will be readily understood, however, that the architecture of the present invention is adaptable to virtually any other data format including IRIG-B or packetized data. This adaptability provides substantial savings in hardware development costs.

Via proper configuration, the decommutator architecture performs the same functions as a de-interleaver, reformatter, and DMS decommutator for DMSP data. De-interleaving and extraction of raw telemetry data are performed on a first architecture. A second cascaded decommutator architecture performs reformatting and decommutation of telemetry data. Alternate methods are available such as to store raw telemetry data to a file on the host processor. The file may then be replayed into the reconfigured decommutator architecture for extracting the next level of decommutated data. This process can be repeated as required for all levels of subcommutation.

It is of primary importance that the decommutator architecture of the present invention allows other types of data formats to be processed with only software download changes made. After the initial software package is written, new data formats may be added with minimal effort. This aids the longevity of the preferred architecture.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A data decommutator architecture for decommutating an input data stream, comprising:
   a sync correlator section for synchronizing the input data stream including a sync code correlator formed of a first field programmable gate array allowing the sync code correlator to be programmed for synchronizing different data formats;
   a data storage buffer, having two storage banks coupled to said sync code correlator for receiving sync data, correlator address and correlator write signals;
   a data decommutator section for decommutating the data received from the data storage buffer, the data decommutator section including a serial to parallel conversion circuit formed of a second field programmable gate array and a primary decommutating transputer, said second field programmable gate array being programmable to allow decommutation of different data formats;
   a post processing section receiving decommutated data from said primary decommutating transputer via transputer links and providing a post processed decommutated data output, said post processing section including at least one post processing transputer for processing the decommutated data into post processed decommutated data;
   wherein said data decommutator section provides a secondary data output for cascading the data decommutator architecture with another data decommutator architecture to provide another level of decommutation.

2. A data decommutator architecture according to claim 1, wherein said sync correlator section further includes a fuzzy logic data correlator receiving the input data stream and wherein the sync code correlator includes:
   a synchronization state machine receiving the input data stream and a match signal from the fuzzy logic data correlator;
   a bit counter receiving bit counter control signals from the synchronization state machine;
   a window logic circuit receiving window addresses from the bit counter and providing a window value signal to the synchronization state machine;
   a verify frame counter circuit receiving verify frame counter control signals from the synchronization state machine and providing a verify frame terminal count signal to the synchronization state machine; and
   a flywheel frame counter receiving flywheel frame control signals from the synchronization state machine and providing a flywheel frame terminal count signal to the synchronization state machine.

3. A data decommutator architecture according to claim 2, wherein the synchronization state machine operates in a search, verify, lock and flywheel mode.

4. A data decommutator architecture according to claim 2, wherein the sync correlator section further includes:
   an interface circuit initially receiving the input data stream and providing an interface output; and
   an input multiplexer having first and second inputs and providing a multiplexer output, said first inputs being coupled to the interface output and said multiplexer output being coupled to the sync code correlator to provide the input data stream.

5. A data decommutator according to claim 1, wherein the serial to parallel conversion circuit includes:
   first and second serial to parallel shift registers each having a serial data in and an enable input and a parallel output, said first shift register further having a shift out output;
   a shift register multiplexer having first and second multiplexer inputs and a multiplexer output, said first multiplexer input and the first serial data in input of the first shift register receiving the sync data from the data storage buffer, the multiplexer output being coupled to the second serial data in input of the second shift register, and the shift out output being coupled to the second multiplexer input;
   a control mask register providing a mask output;
   first and second shift register enable polarity control circuits receiving the mask output and providing enable outputs to the first and second shift register enable inputs, respectively; and a shift bit counter providing count signals to the control mask register and the first and second shift register enable polarity control circuits.

6. A data decommutator architecture according to claim 5, wherein the serial to parallel conversion circuit reads data from one of said storage banks in the data storage buffer while the synchronization state machine writes to the other of said two storage banks.

7. A data decommutator architecture according to claim 1, wherein the transputer is a reduced instruction set computer having dynamic random access memory control circuitry and providing high speed interprocessor data links with DMA circuits.

8. A data decommutator architecture according to claim 1, wherein the post processor section further includes:

a transputer link switch for allowing interprocessor communications between the post processing transputer and the primary decommutating transputer.

9. A data decommutating architecture according to claim 1, further comprising a bus interface section coupled to the post processing transputer for interfacing the data decommutator architecture with a host system.

10. A data decommutator circuit card assembly for a host system for decommutating an input data stream of a particular data type, comprising:

an interface circuit having an input and an output, said input receiving the input data stream at an RS 422 compatible level;

an input multiplexer having first and second multiplexer inputs and an output, said first multiplexer input coupling to the interface output;

a sync code correlator having an input and a synchronized data output, said input being coupled to the multiplexer output to provide synchronization to the incoming data, the sync code correlator being programmable to search for different sync patterns, sync lengths, and sync locations;

a data storage buffer having two data banks coupled to receive the synchronized data output;

a serial to parallel conversion circuit coupled to the data storage buffer for reading the synchronized data in serial form written into the buffer from the sync code correlator and providing a parallel data output, said conversion circuit alternately reading the synchronized data from one of the two data banks while the sync code correlator writes the synchronized data to the other of the two data banks;

a first microcomputer for reading the decommutated parallel data output from the serial to parallel conversion circuit and providing a decommutated data output to postprocessing;

at least one post processing microcomputer coupled to the first microcomputer for performing post processing on the decommutated data output and providing a post processed decommutated data output; and a processor link switch coupled to the first microcomputer and the at least one post processing microcomputer to allow interprocessor communications, the processor link switch including a secondary data input/output port.

11. A circuit card assembly according to claim 10, further comprising:

a bus interface circuit coupled to the post processed secondary data output for interfacing with the host system.

12. A circuit card assembly according to claim 10, wherein the sync code correlator, serial to parallel conversion circuit and first microcomputer include field programmable gate arrays programmable via the host system to configure the circuit card assembly for different data formats.

13. A circuit card assembly according to claim 10, wherein the first microcomputer and the at least one post processing microcomputer are reduced instruction set computers allowing high speed, parallel processing.

14. A circuit card assembly according to claim 10, further comprising:

means for downloading software into said sync code correlator, first microcomputer, and the at least one post processing microcomputer for configuring the circuit card assembly for different data formats.

15. A circuit card assembly according to claim 14, wherein the data decommutation circuit card assembly is configured for at least one of GOES GVAR, GMS, METEOSAT, TIROS HRPT, DMSP RTD, and RDS data formats.

16. A circuit card assembly according to claim 14, further comprising:

means for cascading the circuit card assembly with another identical circuit card assembly for performing sub-levels of data decommutation.

17. A circuit card assembly according to claim 14, further comprising:

a secondary parallel to serial conversion circuit having a parallel data input and a serial data output, the parallel data input being coupled to the first microcomputer, and the serial data output being coupled to the second multiplexer input.

18. A method for operating with a host system a data decommutator architecture to decommutate input data streams of different data formats, the method comprising the steps of:

downloading software from the host system to the data decommutator architecture for a specific data format;

configuring field programmable gate arrays in the data decommutator architecture with said software to process the specific data format;

providing a decommutated data output from the data decommutator architecture;

cascading a second data decommutator architecture to said data decommutator architecture; and performing subcommutation of the decommutated data output from the data decommutator architecture in the second data decommutator architecture.

* * * * *